(12) United States Patent
Kurachi

(10) Patent No.: US 11,439,154 B2
(45) Date of Patent: Sep. 13, 2022

(54) NOODLE BAND CUTTING APPARATUS

(71) Applicant: YUTAKA MFG. CO., LTD., Kounan (JP)

(72) Inventor: Masayasu Kurachi, Kounan (JP)

(73) Assignee: YUTAKA MFG. CO., LTD., Kounan (JP)

( * ) Notice: Subject to any disclaimer, the term of this patent is extended or adjusted under 35 U.S.C. 154(b) by 348 days.

(21) Appl. No.: 16/734,483

(22) Filed: Jan. 6, 2020

(65) Prior Publication Data

US 2020/0221714 A1 Jul. 16, 2020

(30) Foreign Application Priority Data

Jan. 16, 2019 (JP) .............................. JP2019-004903

(51) Int. Cl.
*A21C 11/22* (2006.01)
*A21C 11/24* (2006.01)

(52) U.S. Cl.
CPC .............. *A21C 11/22* (2013.01); *A21C 11/24* (2013.01)

(58) Field of Classification Search
CPC ................................ A21C 11/22; A21C 11/24
See application file for complete search history.

(56) References Cited

U.S. PATENT DOCUMENTS

| | | | | |
|---|---|---|---|---|
| 4,619,189 A * | 10/1986 | Kou | ........................ | A21C 11/22 425/464 |
| 5,770,239 A * | 6/1998 | Ancona | .................. | A21C 11/22 366/97 |
| 6,003,437 A * | 12/1999 | Lu | .......................... | A21C 11/22 99/450.2 |
| 6,187,358 B1 * | 2/2001 | Inoue | ..................... | A21C 11/16 425/316 |
| 6,698,338 B2 * | 3/2004 | Ancona | .................. | A21C 11/22 99/450.2 |
| 9,763,456 B2 * | 9/2017 | Tao | ........................ | A21C 11/22 |
| 10,188,117 B2 * | 1/2019 | Okazawa | ............... | A21C 11/10 |
| 2003/0150337 A1 * | 8/2003 | Ancona | .................. | A21C 11/22 99/349 |
| 2015/0320055 A1 | 11/2015 | Tao et al. | | |
| 2019/0216099 A1 * | 7/2019 | Li | .......................... | A21C 11/24 |

FOREIGN PATENT DOCUMENTS

| | | |
|---|---|---|
| JP | 6150709 A | 3/1986 |
| JP | 2004-065014 A | 3/2004 |

OTHER PUBLICATIONS

Japanese Office Action dated Jan. 7, 2020, in Japanese Patent Application No. 2019-004903.
English translation of Japanese Office Action dated Jan. 7, 2020, in Japanese Patent Application No. 2019-004903.

* cited by examiner

*Primary Examiner* — Seyed Masoud Malekzadeh
(74) *Attorney, Agent, or Firm* — Ladas & Parry LLP; Malcolm J. MacDonald

(57) ABSTRACT

A noodle band cutting apparatus for cutting a noodle band having a predetermined thickness and a predetermined width with cutting devices comprises a moving mechanism and plural cutting devices. One cutting device is selected from the plural cutting devices. The selected one pair of the cutting devices is moved and fixed at a position to cut the noodle band within the moving mechanism.

4 Claims, 6 Drawing Sheets

NOODLE BAND CUTTING APPARATUS

CROSS-REFERENCE TO RELATED APPLICATIONS

This application claims priority to Japanese patent application serial number 2019-4903, the contents of which are incorporated herein by reference for all purposes.

STATEMENT REGARDING FEDERALLY SPONSORED RESEARCH OR DEVELOPMENT

Not applicable.

BACKGROUND

Field of the Invention

Embodiments of the present disclosure relate to a noodle band cutting apparatus.

Noodles, such as Japanese wheat noodles or buckwheat noodles, may be produced by cutting noodle bands with a noodle band cutting apparatus. The thicknesses of the noodles may be varied, and thus the cutting devices of the apparatus need to be replaced depending on a required noodle thickness. For instance, a noodle band cutting apparatus may allow a cutting device to move from a cutting position to a cutting device replacement position. By using such an apparatus, the replacement of the cutting device may be facilitated.

BRIEF SUMMARY

The cutting device for cutting noodle bands may be rotary driven. Thus, the cutting device may be connected to a motor via gears. Such gears are usually lubricated with machining oil. Thus, when the cutting device is replaced, the noodles may be contaminated with the lubricant oil. This is especially problematic for large noodle band cutting apparatus, as the replacement of the cutting devices is not easy due to the heavy weight of the cutting devices. Consequently, improved noodle band cutting apparatuses are needed.

According to a first aspect of the present disclosure, a noodle band cutting apparatus for cutting noodle bands comprises a moving mechanism and plural cutting devices. The noodle band may have a predetermined thickness and width. The noodle bands may be cut with the cutting devices. One cutting device may be selected from the plural cutting devices. Then, the selected cutting devices is moved by the moving mechanism and fixed to a noodle band cutting position.

According to the first aspect, the plural cutting devices are provided in the noodle band cutting apparatus. The selected cutting device is moved and fixed to the noodle band cutting position. As a result, replacement of the cutting devices may be unnecessary as long as the required kinds of cutting devices for cutting the noodle band into different widths are already provided in the noodle band cutting apparatus. Consequently, the replacement frequency of the cutting devices can be decreased.

In the first aspect, the moving mechanism moves the plural cutting devices. For example, there are two methods for moving the cutting devices. Using the first method, the plural cutting devices pass through a position (hereinafter referred to as the "noodle band cutting position") in sequence, until a required cutting device reach the noodle band cutting position. Then, the required cutting device may be held at the noodle band cutting position. Using the second method, the plural cutting devices are at standby positions in a normal time. When one of the cutting devices is required, only the required cutting devices may be moved to the cutting position. It may then be held at the cutting position. The cutting devices may move along or perpendicular to the cutting direction of the noodle band. The moving locus of the cutting devices may be a straight line, a curve line, an arc, or a circle. When the plural cutting devices rotate to pass through the cutting position in sequence, the moving direction of the cutting devices may be either the (anti)clockwise direction or both the clockwise and anticlockwise directions.

DETAILED DESCRIPTION

[Whole Structure of a Noodle Band Cutting Apparatus in an Embodiment]

Figure 1:
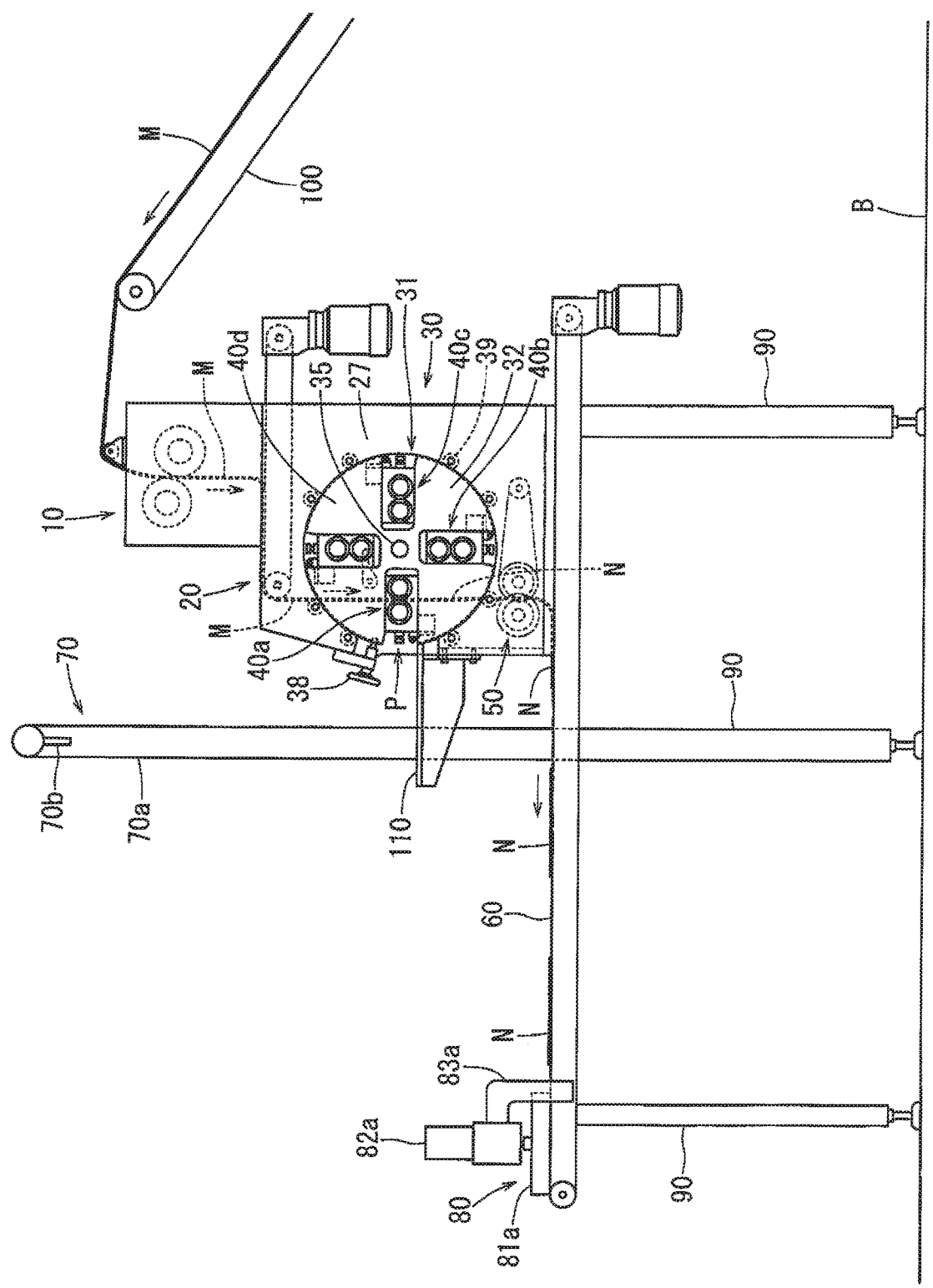
FIG. 1 is a side view of a partial cross section of a noodle band cutting apparatus, according to an embodiment of the present disclosure.

FIG. 1 illustrates an embodiment of the present disclosure. This embodiment describes a noodle band cutting apparatus which has four cutting devices 40a-40d. It is noted that the totality of the cutting devices 40a-40d is generally referred to as a cutting device 40. The cutting devices 40a-40d are used to cut a sheet of dough into pieces. In the present embodiment, noodle bands M, which are delivered from the outside by a delivery conveyor 100 in an arrow direction, are cut into noodles N. The cutting devices 40a-40d may be used separately to cut the noodle band M into different noodle N widths.

The four cutting devices 40a-40d are movably held within a moving mechanism 30. The moving mechanism 30 is supported by frames 90 disposed on a base B. The moving mechanism 30 has a feeding conveyor 20 and feeding rollers 10 in an upper portion of the moving mechanism. The noodle band M is delivered from the delivery conveyor 100 to the feeding rollers 10.

Cutters 50 are provided in the lower portion of the moving mechanism 30. The cutters 50 may be used to cut the noodles N into a given length, the noodles having already been cut by one of the cutting devices 40a-40d. The noodles N cut by the cutter 50 are carried away from the moving mechanism 30 in an arrow direction by a carrying conveyor 60. The carrying conveyor 60 may also be held under the moving mechanism 30 by the frames 90. The carrying conveyor 60 has width aligning rollers 80 downstream of the moving mechanism 30. The width aligning rollers 80 may align and bundle the noodles N, so they are no longer spread on the carrying conveyor 60. The aligned and bundled noodles N are guided to a packaging machine (not shown) downstream of the carrying conveyor 60 and then shipped out. If steps for steaming or frying the noodles are to be included, those steps may be added prior to or after cutting the noodles with cutter 50, as appropriate.

[Structure of Cutting Devices 40]

Figure 4:
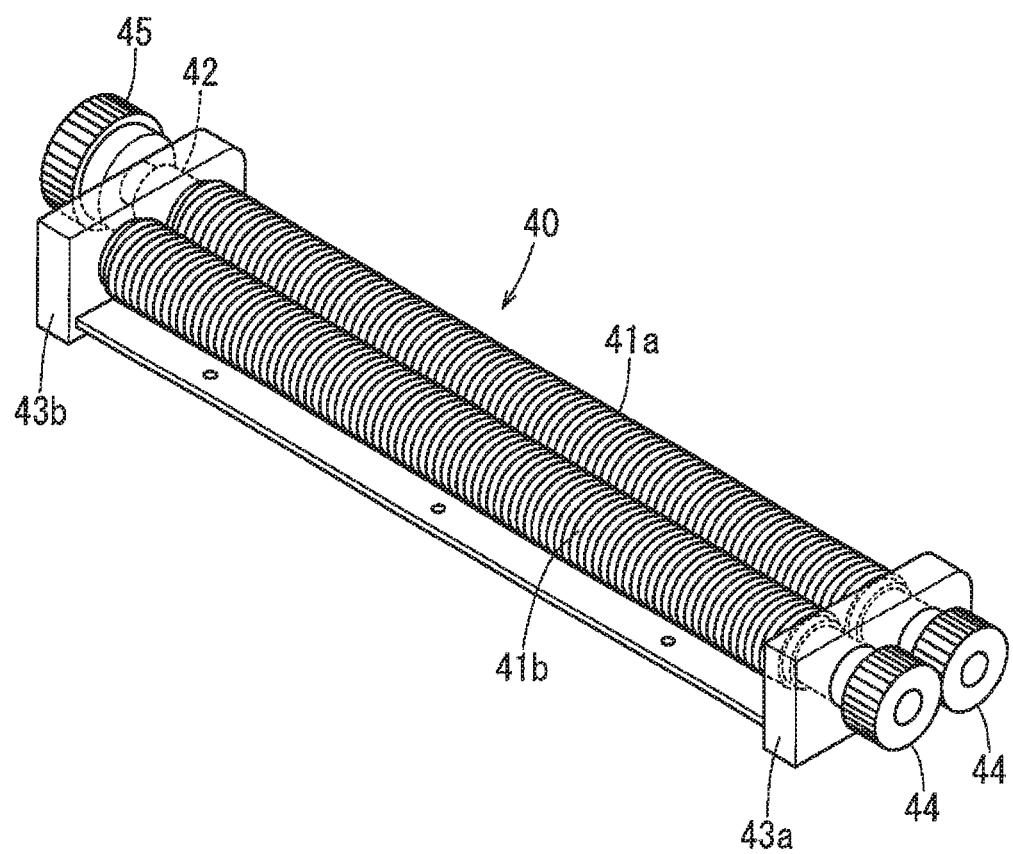
FIG. 4 is a perspective view of a cutting device of the above-mentioned embodiment.

Each cutting devices 40a-40d (40) may be constructed as illustrated in FIG. 4. The cutting device 40 may include two cutting rollers 41a, 41b, which can be combined. The cutting rollers 41a, 41b may each have a row of blades formed on its cylindrical outer peripheries and along axes of its cylindrical bodies. The cutting rollers 41a, 41b are supported by rotational axes 42 between a pair of edge plates 43a, 43b. The cutting rollers 41a, 41b can be rotated in mutually opposite directions each other about the rotation axes 42, with the cutting rollers 41a, 41b engaged with one another. The cutting rollers 41a, 41b are connected via a pair of connection gears 44, which are located outside of the edge plate 43b. The pair of the connection gears 44 allow the cutting rollers 41a, 41b to rotate in mutually opposite directions of each other. The cutting roller 41a can be rotatably driven by a drive gear 45 provided outside of the edge plate 43b. Thus, the noodle band M may be cut with the cutting rollers 41a, 41b by allowing the noodle band M to pass through and between the outer peripheries of the cutting rollers 41a, 41b.

[Structure of Moving Mechanism 30]

Figure 2:
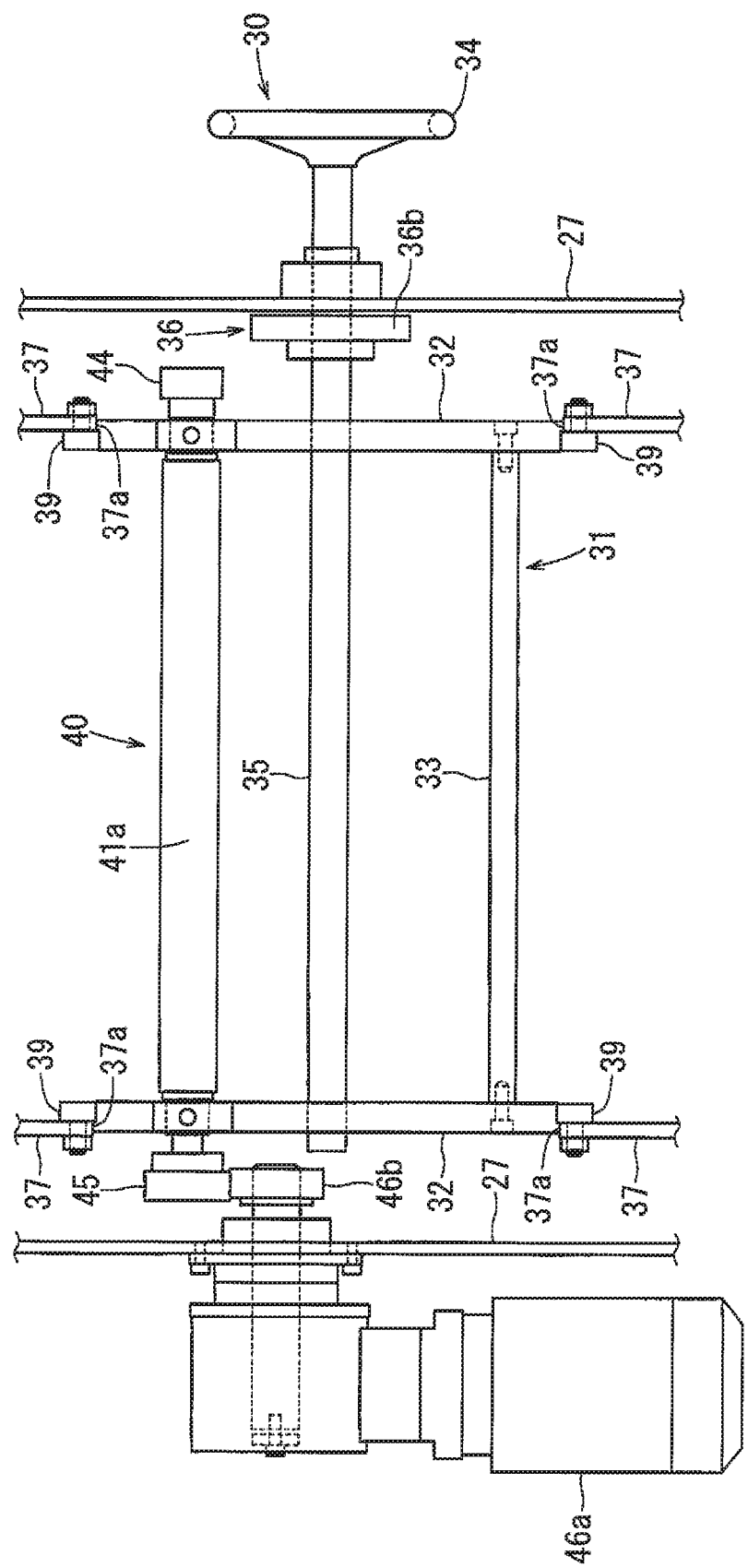
FIG. 2 is an enlarged front view of a movement mechanism of the above-mentioned embodiment.
Figure 3:
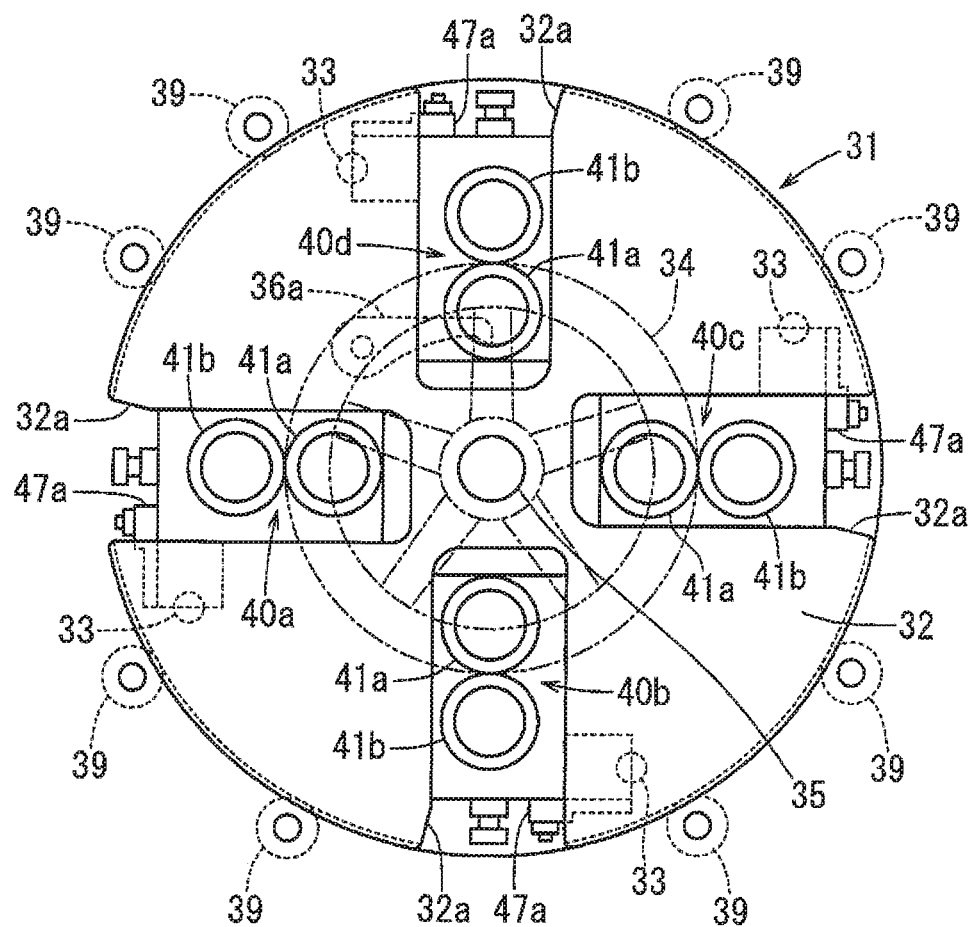
FIG. 3 is an enlarged side view of the movement mechanism of the above-mentioned embodiment.

As illustrated in FIGS. 1 to 3, a pair of discoid edge plates 32 is rotatably supported within a notch 37a of a frame body 37 of the moving mechanism 30. A plurality of guide rollers 39 are distributed around the portions of the frame body 37 surrounding the notch 37a. In this embodiment, eight pieces of the guide rollers 39 are provided. The guide rollers 39 can suppress frictional resistance when the edge plates 32 rotate.

Figure 6:
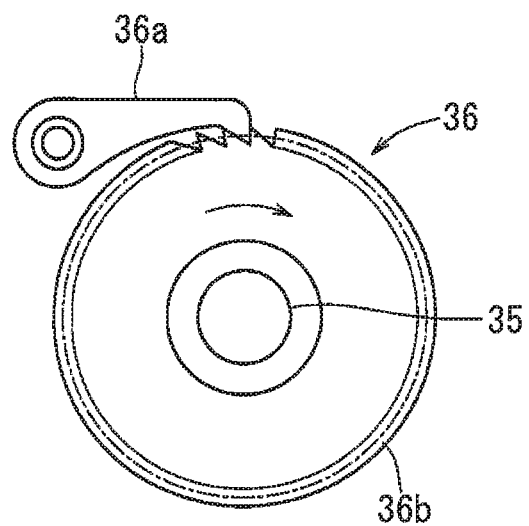
FIG. 6 is an enlarged front view showing a ratchet mechanism of the moving mechanism of the above-mentioned embodiment.

Each edge plate 32 is connected by a plurality (e.g., four pieces) of frames 33 to construct a drum 31. The drum 31 has a rod 35 at its rotation center. The rod 35 passes through an outer frame body 27, the outer frame body 27 being disposed outside of the above-mentioned frame 37. A handle 34 is connected to an edge portion of the rod 35 projecting from the outer frame body 27. The rod 35 is connected to a gear 36b of a ratchet mechanism 36, the ratchet mechanism 36 being provided inside the outer frame body 27. As illustrated in FIG. 6, the gear 36b may be engaged by a pole 36a. As a result, the gear 36b can rotate in an arrow direction illustrated in FIG. 6, while preventing the gear 36b from rotating in the opposite direction. Thus, the drum 31 can be rotated by rotating the handle 34 in the clockwise direction, while preventing it from rotating in the opposite direction.

As illustrated in FIG. 3, each of the edge plates 32 has four notches 32a, which are firmed to extend radially from the rotation center to the outer periphery of the edge plates 32. That is, the notches 32a extend in a radial direction and are formed at even intervals along a circumferential direction of the edge plates 32. The notches 32a are open at the circumferential side of the edge plates 32. The notches 32a are formed so that the cutting devices 40 can fit into the notches 32a from the open outer peripheral sides thereof. When the cutting devices 40 are fitted in the notches 32a, some cutting rollers 41a are positioned at the inner diameter sides of the notches 32a and the other cutting rollers 41b are positioned at the outer diameter sides of the notches 32a. In this way, the cutting devices 40 are held in a circular manner around the rod 35 of the drum 31. Additionally, an adjacent cutting device 40 does not prevent a flow of the noodle band to be cut with the other cutting device 40 positioned at the cutting position P.

As illustrated in FIG. 3, the notch 32a, which is positioned at the cutting position P shown in FIG. 1, has an upper side sloping upward to widen an open side of the notch 32a. The open side of the notch 32a has a lower side on the opposite side of the upper side, the lower side essentially extending horizontally to form a flat surface. Consequently; cutting devices 40 are easily slid into and out of the notches 32a.

Figure 5:
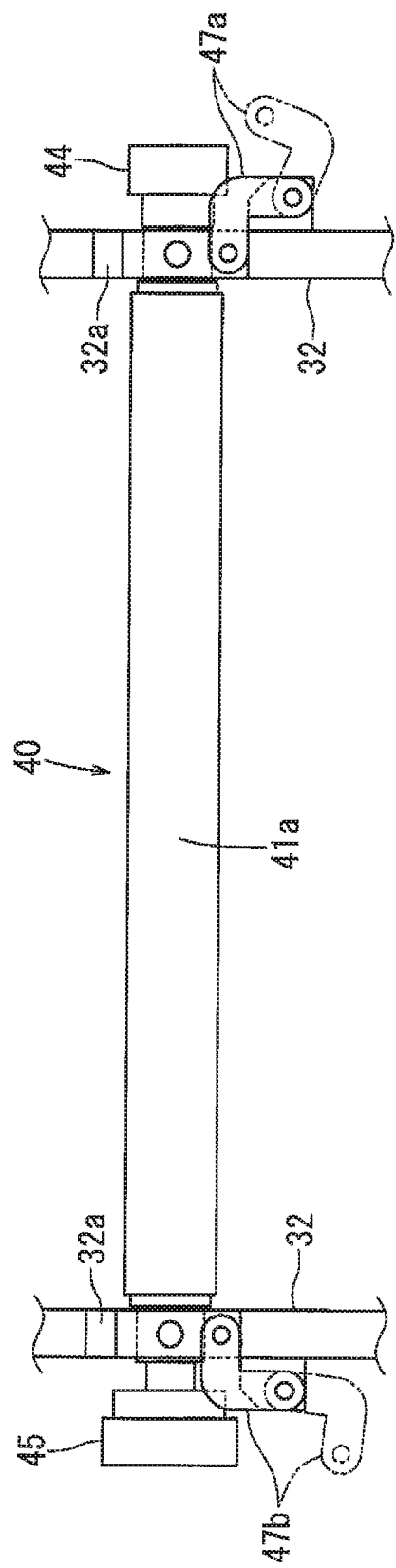
FIG. 5 is an enlarged front view showing the cutting device held in a notch of an edge plate of the above-mentioned embodiment.

As illustrated in FIGS. 3 and 5, stoppers 47a, 47b are disposed at the outer peripheral sides of the notches 32a. The stoppers 47a, 47b may be rotated, for example from the virtual line positions to the solid line positions as shown in FIG. 5, when the cutting devices 40 are fitted into the notches 32a. As a result, the stoppers 47a, 47b may block the outer peripheral sides of the notches 32a such that the cutting devices 40 do not fall out of the notches 32a.

In this way, four cutting devices 40a-40d are held in a circular manner by the drum 31. The cutting devices 40a-40d may be rotated around the rotation axis of the drum 31, along which the rod 35 extends. The rotation axis extends parallel to the cutting rollers 41a, 41b. In this way, the moving mechanism 30 can be a compact structure. In FIG. 2, for the purpose of showing the rotation axis more clearly, the cutting roller 41a (cutting device 40) is positioned apart from the rotation axis (rod 35). Further, the cutting roller 41b is omitted in FIG. 2.

As illustrated in FIG. 2, the drive gear 45 of the cutting device 40 can be rotary driven by a motor 46a via an output gear 46b. The output gear 46b is disposed so that it may engage the drive gear 45 when a cutting device 40 stops at the cutting position P, shown in FIG. 1. When the cutting device 40 is positioned at a position other than the cutting position P, the output gear 46b does not engage the drive gear 45.

As illustrated in FIG. 1, when one of the cutting devices 40a-40d stops at the cutting position P, the noodle band M moves from the feeding conveyor 20 to between the cutting rollers 41a, 41b in a dashed arrow direction. At this time, the pair of the cutting rollers 41a, 41b are positioned side-by-side in a substantially horizontal direction. Thus, the noodle band. M can be cut sharply. Additionally, the pole 36a of the ratchet mechanism 36 may engage the gear 36b to stop the rotation of the gear 36b. This engagement between the pole 36a and the gear 36b in the ratchet mechanism 36 may serve aid the positioning of the cutting device 40a-40d in the cutting position P.

The frame body 37 has a position stopper 38. The position stopper 38 is attached to the edge portion of the frame body 27 by a screw structure. The position stopper 38 can be freely movable back and forth toward the edge plate 32, for instance by a screw structure. The position stopper 38 has a tip portion configured to contact the portion of the edge plate 32 positioned above the cutting device 40a-40d stopped at the cutting position P. The position stopper 38 can prevent the edge plate 32 from rotating by contacting its tip portion to the edge plate 32.

As illustrated in FIG. 1, the frame body 27 substantially surrounds the edge plate 32.

The frame body 37 is opened only at a portion corresponding to the cutting position P. Thus, the cutting devices 40 are replaceable through the notch 32a, positioned at this opened position. A bed 110 is provided in front of the edge plate 32. The bed 110 is located near the notch 32a positioned at the cutting position P, so that the cutting device 40 may be put on the bed 110. Thus, the cutting device 40 may be removed from the notch 32a positioned at the cutting position P and placed on the bed 110. Then, the removed cutting device 40 may be replaced with another cutting device 40 tier cutting the noodle band M into a different noodle width.

Such replacement operation can be done efficiently using a crane tower 70. The crane tower 70 may be provided adjacent to the bed 110. The crane tower 70 has a tower 70a that is higher than the moving mechanism 30. The crane tower 70a is erected and supported by the frame 90. The crane tower 70a has a hook 70b at the upper portion of the tower 70a in order to hang a hoist (not shown). The cutting device 40 located on the bed 110 can easily be replaced using the hoist of the crane tower 70.

[Structure of Width Aligning Rollers 80]

Figure 7:
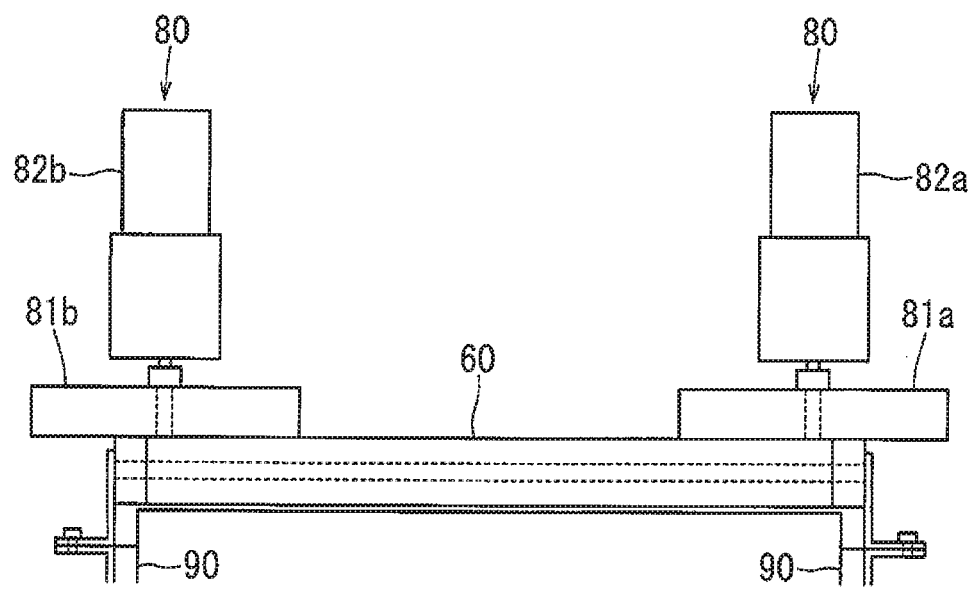
FIG. 7 is an enlarged front view showing width aligning rollers of the above-mentioned embodiment.

As illustrated in FIGS. 1 and 7, a pair of the width aligning rollers 80, which are positioned to face each other may be disposed at the downstream-most side of the carrying conveyor 60. The width aligning rollers 80 have roller bodies 81a, 81b as rotors. The roller bodies 81a, 81b have rotational planes located closely above the carrying conveyor 60. The roller bodies 81a, 81b may rotate along the surface of the carrying conveyor 60. The roller bodies 81a, 81b are configured to be rotary driven by motors 82a, 82b, respectively. The aligning rollers 80 are supported by the frame 90 via frame 83a.

The roller bodies 81a, 81b may be rotated by motors 82a, 82b to align the noodles N, which are being carried by the carrying conveyor 60. Specifically, the outer peripheries of the rotating roller bodies 81a, 81b may gather the noodles N from both sides, and align the noodles N in a center area of the carrying conveyor 60. In this embodiment, when viewed from above of the carrying conveyor 60, one roller body 81a may be rotated counterclockwise and the other roller body 81b may be rotated clockwise.

As illustrated in FIG. 1, the delivery conveyor 100 delivers the noodle band M. The thickness of the noodle band M may be adjusted by the rollers 10 and then delivered to the feeding conveyor 20. After that, the noodle band M is cut with the cutting device 40 positioned at the cutting position P in order to produce the noodles N. Then, the noodles N are cut in given lengths by the cutter 50 and subsequently carried away by the carrying conveyor 60. The noodles N are gathered into bundles by the width aligning rollers 80 and then guided to the packaging machine.

An operator may adjust the thickness of the noodles N by using a desired cutting device 40 corresponding to a desired noodle N thickness. Specifically, the operator may select the desired cutting device from the cutting devices 40a-40d located in the drum 31 by rotating the drum 31 using the handle 34 of the moving mechanism 30. In this way, the desired cutting device 40 may be positioned and fixed at the cutting position P, which is illustrated in FIG. 1. The tip portion of the position stopper 38 may be separated from the edge plate 32 to allow rotation of the drum 31. The tip portion of the position stopper 38 may then be moved to contact the edge plate 32 in order to lock the drum 31 in a non-rotational state.

However, if the desired cutting device 40, which correspond to a desired thickness, is not in the currently installed set of cutting devices 40a-40d, the operator may replace the cutting device 40 positioned at the cutting position P. The operator may optionally use the crane tower 70 and the hoist (not shown) to replace the cutting devices 40. The cutting devices 40 may be replaced in the same way as described above, for example, when the cutting devices 40 are abraded and need to be replaced.

According to the above described embodiment. the cutting devices 40a-40d are installed in the moving mechanism 30. Thus, the cutting device 40 may be easily switched to from among the installed cutting devices 40a-40d, simply by rotating the drum 31. Consequently, for example, contamination of the noodle bands M or the noodles N can be prevented. As previously mentioned, contamination may occur during replacement of the cutting devices 40.

If a cutting device 40, which is needed to obtain a desired noodle N thickness, is not currently installed in the moving mechanism 30, or if the cutting device 40 needs to be replaced due to other reasons such as abrasion of the cutting rollers, the cutting devices 40 can be easily replaced. Specifically, the operator may remove the cutting device 40 positioned at the cutting position P from the notch 32a. Then, the operator may move the cutting device 40 laterally and put it on the bed 110. Subsequently, the operator can move a replacement cutting device 40 laterally over the bed 110 and attach it within the notch 32a. In this way, the cutting devices 40 can be easily replaced.

[The Other embodiment]

While the present disclosure have been described herein with reference to a specific embodiment, various kinds of changes, additions, or deletion for, but are not limited to, for example, their appearances or structures of the disclosure may be possible. For example, in the above-described embodiment, four cutting devices are built in the moving mechanism. However, the number of the cutting devices may be any number more than one. Further, in this embodiment, different cutting devices are used to cut the noodle bands into different cutting widths. However, the cutting widths may instead be the same.

What is claimed is:

1. A noodle band cutting apparatus for cutting noodle bands having a predetermined thickness and width, comprising:
   a moving mechanism; and
   plural cutting devices,
   wherein one of the cutting devices is selected from the plural cutting devices by being moved and being fixed at a noodle band cutting position,
   wherein the moving mechanism includes a drum having a pair of circular edge plates, and a plurality of frames connecting the edge plates, a rod provided at a center of the drum, and a handle connected to an edge portion of the rod,
   wherein the drum is configured to rotate around the rod by rotating the handle,
   wherein the edge plates have a number of notches equal to that of the number of cutting devices,
   wherein the notches are formed to extend in a radial direction of the edge plates, and open at a circumferential side thereof, and
   wherein both longitudinal ends of the plural cutting devices are supported in the notches of the edge plates.

2. The noodle band cutting apparatus according to claim 1,
   wherein each cutting device includes two cutting rollers, each having a row of blades which are formed on a cylindrical outer periphery of the cutting rollers and aligned along an axis of its cylindrical body,
   wherein each pair of cutting rollers are rotated in mutually opposite directions in a state that the blades are engaged with each other, and
   wherein a noodle band is cut by the cutting devices by passing the noodle band between the cylindrical outer peripheries of the cutting rollers,
   wherein the moving mechanism has a position stopper, wherein the drum holds the plural cutting devices in a circular manner in a state that the rotational axes of the cutting rollers extend parallel to each other, wherein the drum rotates around a center of a circle formed by the plural cutting devices, and wherein the position stopper serves to stop the selected one of the cutting devices held in the drum at the noodle band cutting position.

3. The noodle band cutting apparatus according to claim 2, wherein both of the longitudinal ends of the plural cutting devices are fitted into the notches from the circumferential side of the edge plates so that the cutting devices are held by the edge plates.

4. The noodle band cutting apparatus according to claim 2, wherein the number of plural cutting devices is four, wherein each cutting roller of each pair of the cutting rollers is positioned at an inner diameter side of the notches, and each other cutting roller of each pair of the cutting rollers is positioned at an outer diameter side of the notches in the radial direction from the rotational center of the drum, and wherein the cutting devices are arranged at even intervals in a rotational direction of the drum.

* * * * *